United States Patent
Nell et al.

(10) Patent No.: US 8,944,931 B2
(45) Date of Patent: Feb. 3, 2015

(54) TRAINING AID FOR A GOLFER

(71) Applicants: Willem Andre Sternberg Nell, Equestria (ZA); Pieter Rynners, Pretoria North (ZA)

(72) Inventors: Willem Andre Sternberg Nell, Equestria (ZA); Pieter Rynners, Pretoria North (ZA)

( * ) Notice: Subject to any disclaimer, the term of this patent is extended or adjusted under 35 U.S.C. 154(b) by 0 days.

(21) Appl. No.: 14/090,814

(22) Filed: Nov. 26, 2013

(65) Prior Publication Data
US 2014/0309050 A1    Oct. 16, 2014

(30) Foreign Application Priority Data

Apr. 16, 2013 (ZA) .................................. 2013/02731
Oct. 8, 2013 (ZA) .................................. 2013/07510

(51) Int. Cl.
*A63B 69/36* (2006.01)

(52) U.S. Cl.
CPC ..... *A63B 69/3608* (2013.01); *A63B 2243/0029* (2013.01); *A63B 2207/02* (2013.01)
USPC ............................. 473/209; 473/207; 362/191

(58) Field of Classification Search
USPC .................. 473/207–217, 219–224, 268, 269
See application file for complete search history.

(56) References Cited

U.S. PATENT DOCUMENTS

| | | | | |
|---|---|---|---|---|
| 5,284,345 A | * | 2/1994 | Jehn ................................ | 473/209 |
| 5,800,278 A | * | 9/1998 | Varriano ........................ | 473/209 |
| 6,672,972 B1 | * | 1/2004 | Stone ............................. | 473/207 |
| 7,229,361 B1 | * | 6/2007 | Park et al. ...................... | 473/268 |

* cited by examiner

*Primary Examiner* — Nini Legesse
(74) *Attorney, Agent, or Firm* — Fitch, Even, Tabin & Flannery LLP

(57) ABSTRACT

This invention relates to a training aid 10, 100 for a golfer. The training aid 10 mounts to a golfer's cap 24 or sunglasses and includes a battery powered collimated light source 12 in the form of an LED which is configured to emit collimated, visible light. The aid 10 further includes an electronic circuit which comprises a microcontroller 17 which is drivingly connected to the LED and an electronic orientation sensor 16 which is configured to sense the orientation of the LED. The circuit and LED are housed within a housing and a mounting formation is provided for mounting the training aid 10 to a user. In response to an orientation of the light source 12 sensed by the electronic sensor 16, the microcontroller 17 automatically interrupts emission of light when the training aid 10 is orientated outside of a predefined operative angular range.

9 Claims, 5 Drawing Sheets

TRAINING AID FOR A GOLFER

FIELD OF INVENTION

This invention relates to the game of golf and in particular to a training aid for a golfer.

BACKGROUND OF INVENTION

The Inventors are aware of existing golf training aids, although not readily available on the market, which comprise a collimated light source which is removably attached to a golf player's cap. The light source emits a visible beam of light which is projected onto the ball when a player positions his/her head over a golf ball before playing a stroke. Head movement during the golf swing is unwanted and the visible dot projected onto the ball will move in response to any head movement which will serve to indicate to the player that he/she is moving his/her head during the swing. Use of such devices poses a safety risk, however, owing to the fact that the light intensity emitted by the light source could be harmful to a person's eyes when directed into that person's eyes.

The Inventors desire a training aid which at least alleviates the problem identified above.

SUMMARY OF INVENTION

In accordance with the invention, there is provided a training aid for a golfer which includes:
  a collimated light source which is operatively powered by a power source and which is configured to emit collimated, visible light in at least one direction;
  an electronic circuit which is drivingly connected to the light source, the circuit including at least one electronic orientation sensor which is configured to sense the orientation of the light source;
  a housing within which the light source is at least partially received; and
  a mounting formation for mounting the training aid to a user, wherein, in response to a light source orientation sensed by the electronic sensor, the electronic circuit is configured automatically to interrupt emission of light from the light source when the training aid is orientated outside of a predefined operative angular range relative to the vertical.

The predefined operative angular range of the training aid may be defined by an arc extending upward from the vertical such that when the training aid is substantially horizontal, emission of light from the light source is interrupted.

The electronic circuit may include a microcontroller which is drivingly connected to the light source and is configured to control power supply to the light source in response to an orientation measurement received from the electronic orientation sensor.

The light source may be in the form of a Light Emitting Diode (LED) or LASER.

The operative angular range of the training aid may be in an upward arc with respect to the vertical having an angle ranging between 50° and 100°, both inclusive.

The training aid may include an on/off switch which is configured to allow an operator selectively to turn the light source on and off, wherein in an off state, the light source remains off, irrespective of the orientation of the training aid.

The mounting formation may be pivotally connected to the housing to facilitate angular adjustment of the housing relative to the mounting formation. The mounting formation may be in the form of a crocodile clip which is biased to a closed position.

Alternatively, the mounting formation may be in the form of a frame of a pair of glasses, the light source, power source and electronic circuit being integrated into the frame in a configuration in which the light source faces forward and is orientated in a line of sight of a wearer of the glasses.

The power source may be a battery.

BRIEF DESCRIPTION OF DRAWINGS

The invention will now be further described, by way of example, with reference to the accompanying diagrammatic drawings.

In the drawings.

DETAILED DESCRIPTION OF AN EXAMPLE EMBODIMENT

Figure 1:
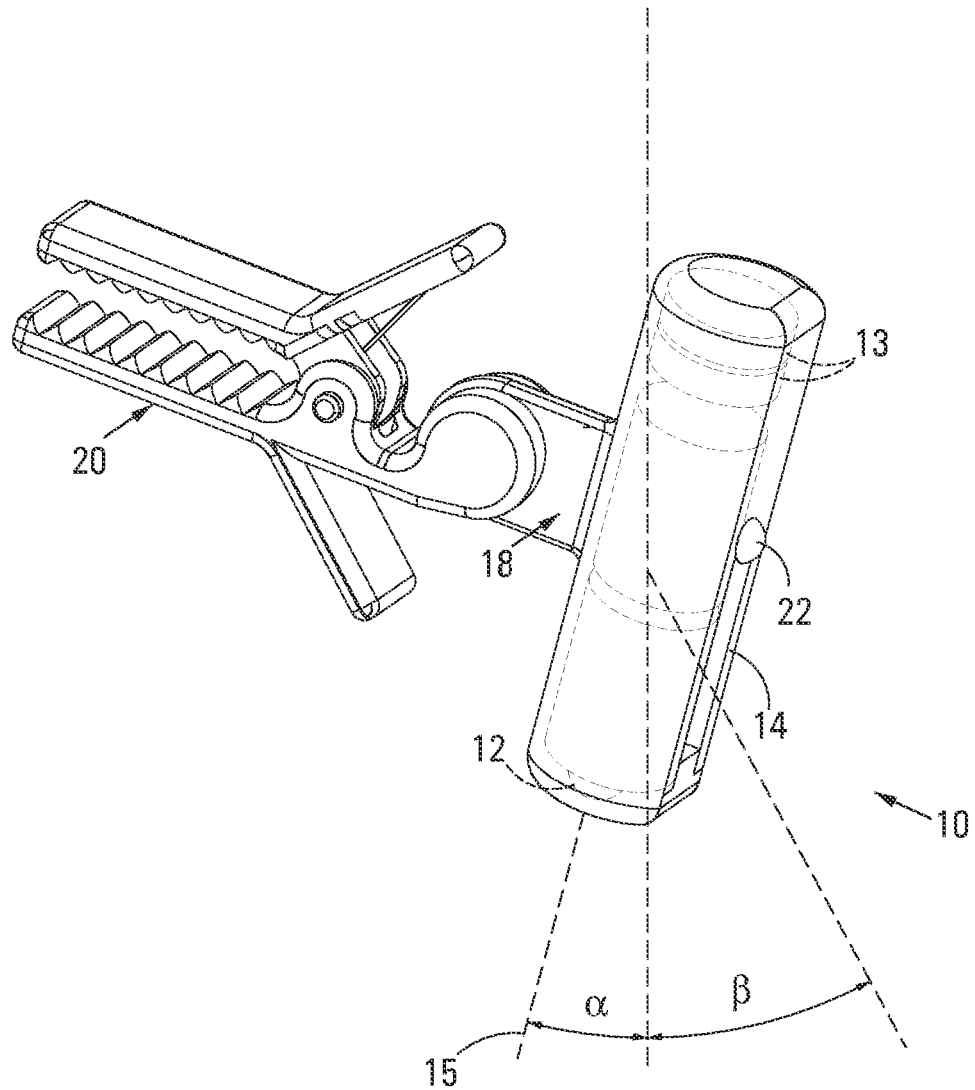
FIG. 1 illustrates a three-dimensional view of a training aid in accordance with the invention.

In FIGS. 1 to 4, reference numeral 10 refers generally to a first embodiment of a training aid for a golfer in accordance with the invention. The training aid 10 includes a collimated light source 12 in the form of a Light Emitting Diode (LED) or LASER which is powered by batteries 13 and is configured to emit a beam of collimated light 15 in the visible light spectrum.

Figure 2:
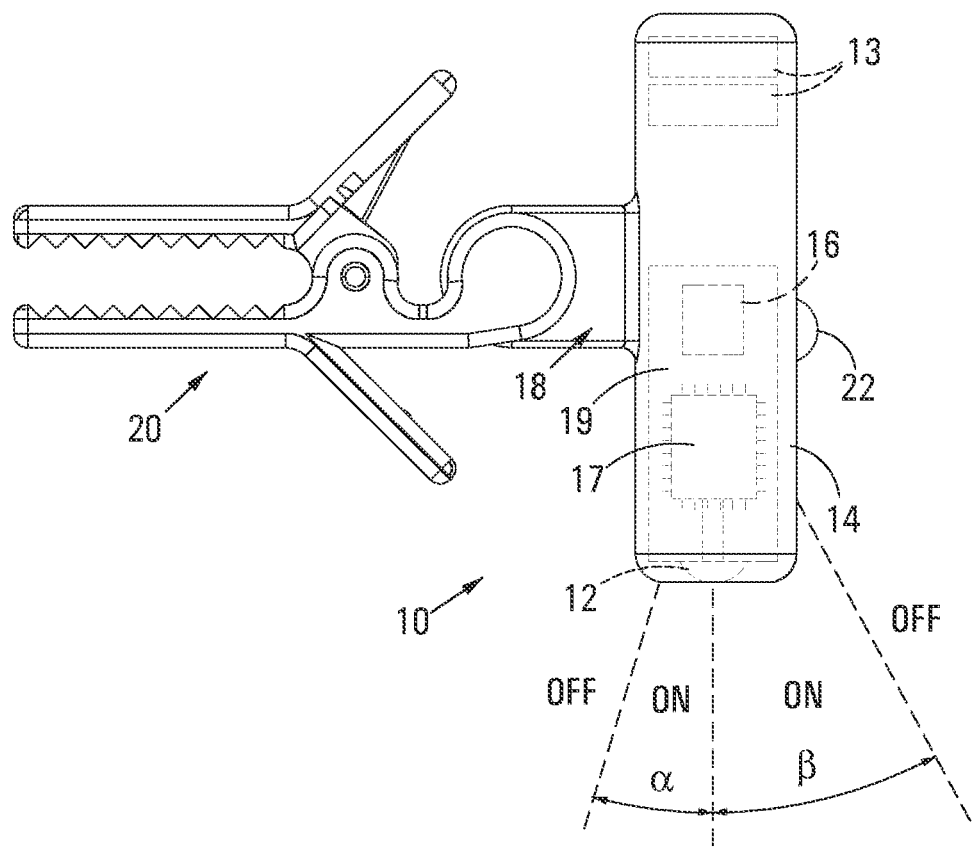
FIG. 2 illustrates a diagrammatic side elevation of the training aid of FIG. 1 showing certain internal components.
Figure 3:
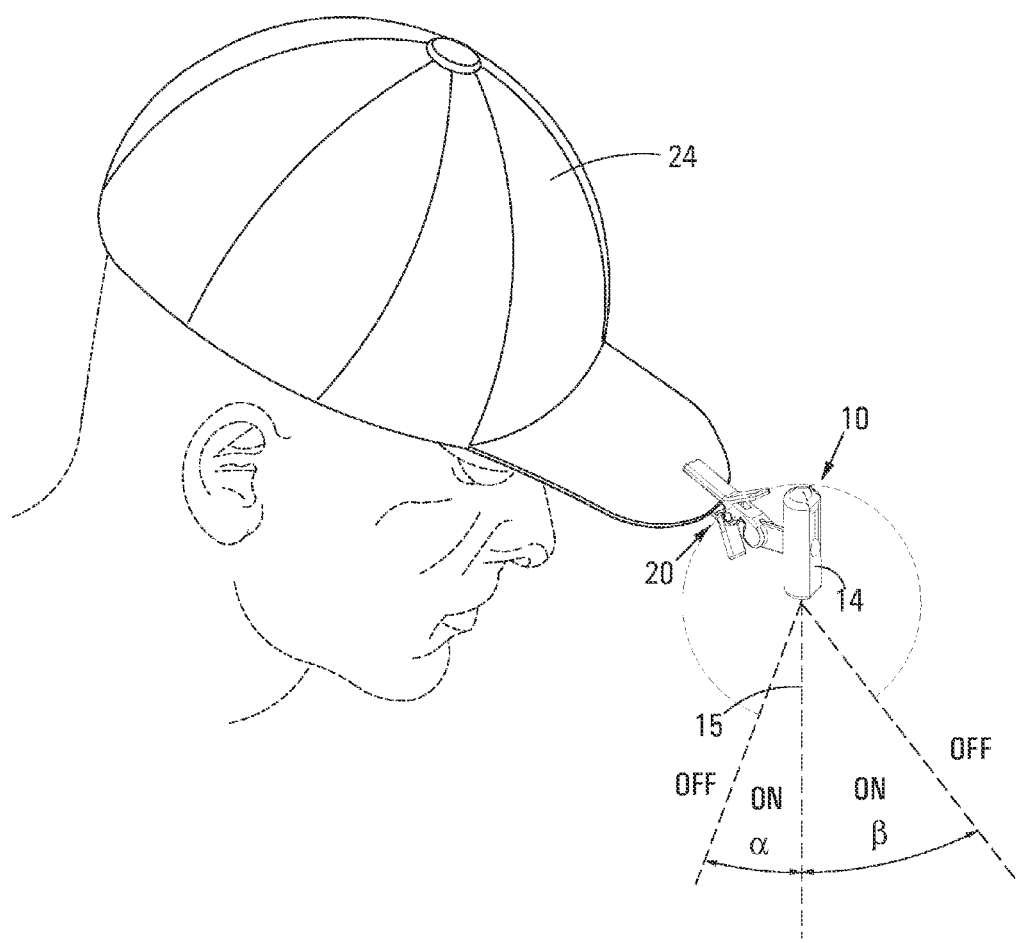
FIG. 3 shows the training aid of FIG. 1 in use.

In the embodiment of the invention illustrated in FIGS. 1 to 3, the light source 12 and batteries 13 are accommodated within an elongate, roughly circular cylindrical housing 14. The light source 12 is disposed toward one end of the housing 14 which has an opening through which the beam of light 15 is emitted during use. An attachment portion 18 is attached to the housing 14 and extends laterally away from the housing 14. A mounting formation in the form of a crocodile clip 20 is pivotally mounted to the attachment portion 18. The crocodile clip 20 is biased to a closed position by a resilient spring in conventional fashion and is configured to clip onto a player's cap or sunglasses.

Figure 4:
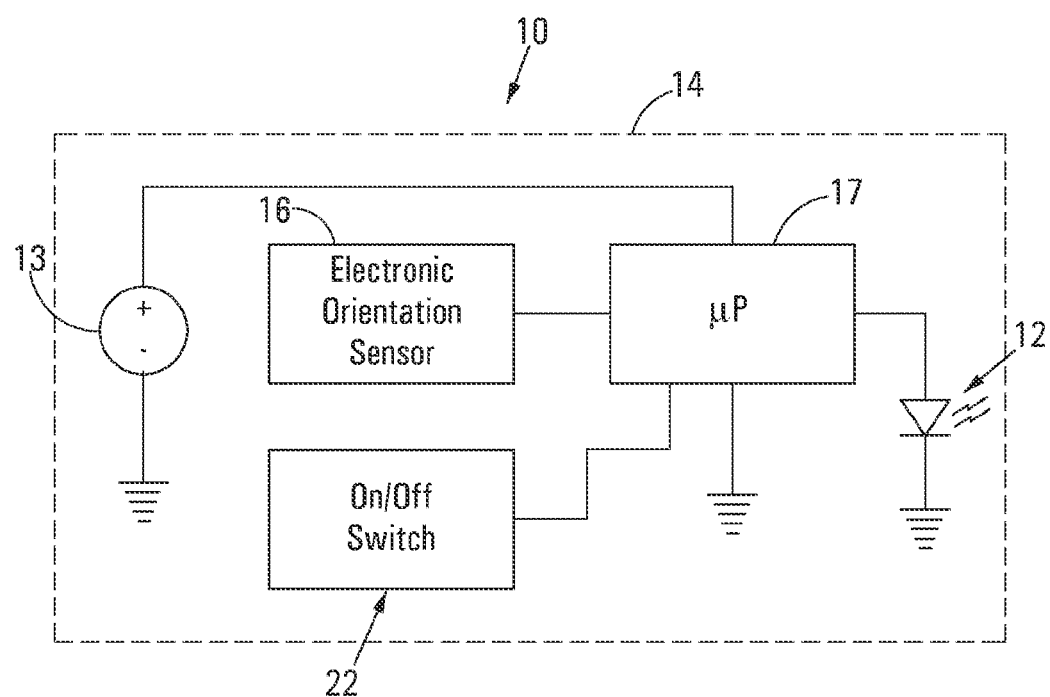
FIG. 4 illustrates a schematic circuit diagram of the training aid.

With reference to FIGS. 2 and 4, the training aid 10 further includes an electronic orientation sensor, generally indicated by numeral 16, and a microcontroller 17 which are mounted to a Printed Circuit Board (PCB) 19 housed within the housing 14. The sensor 16 may be in the form of a three dimensional orientation/motion sensor or accelerometer found in portable electronic devices such as mobile phones. The sensor 16 is configured to measure gravitational orientation and a change in gravitational orientation, for example from vertical to horizontal and vice versa. The sensor 16 is connected as an input to the microcontroller 17. The light source 12 is connected to an output pin of the microcontroller 17 which drives the light source 12. The microcontroller 17 is programmable and in this example embodiment has been configured automatically to interrupt the supply of power to the light source 12 when the training aid 10 is orientated such that a direction of light emission (see reference numeral 15 in FIGS. 1 and 3) of the light source 12 is outside of a predefined angular range of motion. Activation of the light source 12 is therefore controlled by the microcontroller 17 in response to input signals received from the orientation sensor 16. The training aid 10 further includes an on/off switch 22 in the form of a conventional pushbutton which is connected to the microcontroller 17 as a further input device. The microcontroller 17 is programmed such that when the on/off switch 22 is off, power to the light source 12 is interrupted irrespective of the orientation of the training aid 10. The sensor 16 therefore only comes into operation when the training aid is switched on via the switch 22.

Figure 5:
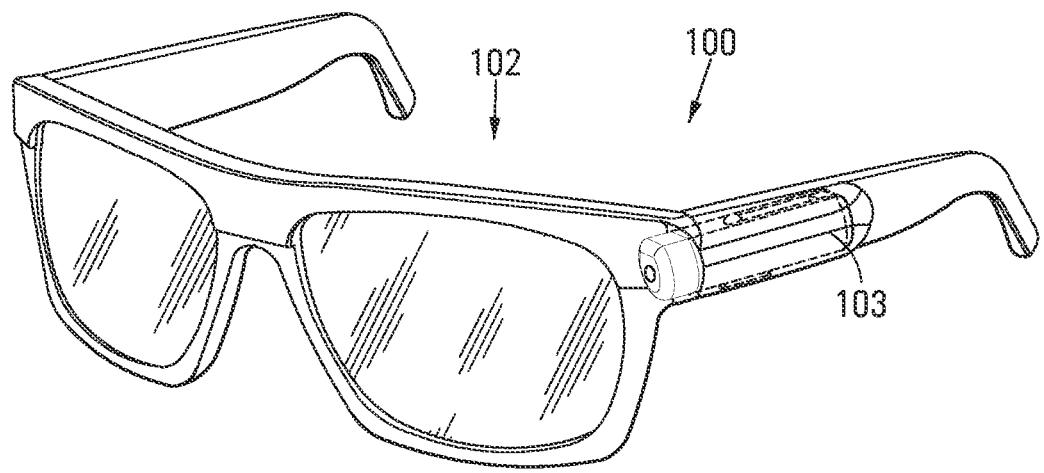
FIG. 5 illustrates a further embodiment of the training aid in accordance with the invention.

A further embodiment of the training aid in accordance with the invention is illustrated in FIG. 5 and referenced by numeral 100. In this second embodiment, the light source, orientation sensor, microcontroller and power source (batteries) have been integrated into a pair of sunglasses worn by a golf player. Essentially, when compared to the training aid 10, the attachment portion 18 and crocodile clip 20 have been omitted in the training aid 100. Accordingly, the abovementioned components are incorporated or integrated into a frame 102 of the sunglasses, and in particular into a temple (arm) 103 of the frame 102 which is hingedly connected to a rim such that the light source faces forward and is orientated in the line of sight of the sunglasses.

When the switch 22 is on and the light source 12 is orientated in a substantially vertically downward direction as sensed by the sensor 16, the training aid 10 emits light via the light source 12 on an object positioned below the aid 10. In use, the training aid 10 is attached to the brim of a golf player's cap 24 (see FIG. 3) or to a frame of a pair of sunglasses (this configuration is not shown in the drawings) using the crocodile clip 20. In preparation for a shot, with the training aid 10 switched on, the player positions his head over the golf ball and pivotally adjusts the housing 14 relative to the crocodile clip 20 correctly to align the light beam 15 onto the ball or a focal position on the ground adjacent to the ball. In accordance with prior inventions, once a player has completed his stroke, he lifts up his head and in so doing may project harmful light into the eyes of a bystander. In accordance with the present invention, in order to prevent this from happening, the sensor 16 and microcontroller 17 are configured automatically to interrupt the supply of power to the light source 12 once the training aid 10 moves out of a predefined, predominantly downwardly facing angular range. Naturally the operative range of motion of the training aid 10 may be altered by reprogramming the microcontroller 17. In this example embodiment, with reference to FIGS. 1 to 3, the operative angular range of motion is $\alpha=10°$ from the vertical towards the player and $\beta=45°$ from the vertical, in the opposite direction, away from the player. In other words, the training aid 10 emits light while orientated within an upward arc of $(\alpha+\beta)=55°$. Outside of this arc the light source 12 is interrupted. Naturally, the arc $(\alpha+\beta)$ within which the training aid 10 operates can be modified or altered according to design requirements without departing from the scope of the invention. The range of motion is also not limited to a single plane or a single pair of axes and may extend to a three dimensional operational range.

It is to be appreciated that the light source 12 may be operable to emit visible light in different colours, for example, red, blue, green etc. Also, the training aid 10, 100 may have different modes of operation, for example, a constant light beam and a light beam which flashes on and off at a predetermined frequency etc.

In this example embodiment the training aid 10, 100 therefore has an operative range of motion of 55° during which the light source 12 emits light. When the training aid 10 is in any angular position outside the upward arc of 55°, the light source 12 is automatically switched off by the microcontroller 17 to prevent light from being inadvertently shone into a person's eyes. The sensor 16 therefore operates as an automatic safety switch. An added advantage is that battery life of the training aid 10 is prolonged through the use of the sensor 16. Although the main purpose and use of the training aid 10 is for the game of golf, it is perceivable that the training aid 10 may be used in other sports, for example darts, in order to improve the hand-eye coordination of a player. In this instance, the operative range of the sensor 16 will have to be reconfigured or overridden as the training aid 10 will operate largely in a horizontal plane. The training aid 10, 100 is suitable for indoor and outdoor use.

The invention claimed is:

1. A training aid for a golfer, the training aid including:
   a collimated light source which is operatively powered by a power source and which is configured to emit collimated, visible light in at least one direction;
   an electronic circuit which is drivingly connected to the light source, the circuit including at least one electronic orientation sensor which is configured to sense the orientation of the light source;
   a housing within which the light source is at least partially received; and
   a mounting formation for mounting the training aid to a user, wherein, in response to a light source orientation sensed by the electronic sensor, the electronic circuit is configured automatically to interrupt emission of light from the light source when the training aid is orientated outside of a predefined operative angular range relative to the vertical.

2. A training aid as claimed in claim 1, wherein the predefined operative angular range of the training aid is defined by an arc extending upward from the vertical such that when the training aid is substantially horizontal, emission of light from the light source is interrupted.

3. A training aid as claimed in claim 2, wherein the electronic circuit includes a microcontroller which is drivingly connected to the light source and is configured to control power supply to the light source in response to an orientation measurement received from the electronic orientation sensor.

4. A training aid as claimed in claim 3, wherein the light source is in the form of a Light Emitting Diode (LED).

5. A training aid as claimed in claim 3, in which the operative angular range of the training aid is in an upward arc with respect to the vertical having an angle ranging between 50° and 100°, both inclusive.

6. A training aid as claimed in claim 5, wherein the mounting formation is pivotally connected to the housing to facilitate angular adjustment of the housing relative to the mounting formation.

7. A training aid as claimed in claim 6, wherein the mounting formation is in the form of a crocodile clip which is biased to a closed position.

8. A training aid as claimed in claim 5, wherein the mounting formation is in the form of a frame of a pair of glasses, the light source, power source and electronic circuit being integrated into the frame in a configuration in which the light source faces forward and is orientated in a line of sight of the glasses.

9. A training aid as claimed in claim 1, which includes an on/off switch which is configured to allow an operator selectively to turn the light source on and off, wherein in an off state, the light source remains off, irrespective of the orientation of the training aid.

* * * * *